United States Patent [19]

Kobayashi et al.

[11] Patent Number: 5,144,824
[45] Date of Patent: Sep. 8, 1992

[54] PROCESS FOR THE PREPARATION OF A THICKNESS-REDUCED DRAW-FORMED CAN

[75] Inventors: Akira Kobayashi; Katsuhiro Imazu; Masanori Aizawa; Tomomi Kobayashi, all of Yokohama, Japan

[73] Assignee: Toyo Seikan Kaisha, Ltd., Tokyo, Japan

[21] Appl. No.: 599,772

[22] Filed: Oct. 18, 1990

[30] Foreign Application Priority Data

Oct. 18, 1989 [JP] Japan .................... 1-269013

[51] Int. Cl.$^5$ .............................................. B21C 24/00
[52] U.S. Cl. ........................................ 72/46; 428/35.8
[58] Field of Search ............... 72/46, 347; 427/388.1, 427/388.2; 156/224, 223, 221, 220

[56] References Cited

U.S. PATENT DOCUMENTS

| | | | |
|---|---|---|---|
| 3,340,714 | 9/1967 | Pohl et al. | 156/224 |
| 3,832,962 | 9/1974 | Rolles | 72/46 |
| 3,933,559 | 1/1976 | Watanabe | 156/224 |
| 4,269,053 | 5/1981 | Agrawal et al. | 72/46 |
| 4,412,440 | 11/1983 | Phalin et al. | 72/46 |
| 4,424,100 | 1/1984 | McCarty et al. | 72/46 |
| 4,734,303 | 3/1988 | Fujiwara et al. | 428/35.9 |

FOREIGN PATENT DOCUMENTS

| | | | |
|---|---|---|---|
| 3832470 | 4/1989 | Fed. Rep. of Germany | 427/388.1 |
| 0008041 | 1/1985 | Japan | 427/388.1 |
| 2087286 | 4/1987 | Japan | 427/388.1 |
| 2252613 | 11/1987 | Japan | 72/46 |
| 1189548 | 11/1985 | U.S.S.R. | 72/46 |

Primary Examiner—Lowell A. Larson
Assistant Examiner—Michael J. McKeon
Attorney, Agent, or Firm—Sughrue, Mion, Zinn Macpeak & Seas

[57] ABSTRACT

In the production of a thickness-reduced draw-formed can by draw-redraw forming and bending elongation, by using a laminated metal plate comprising a metal plate and a coating layer of a thermoplastic resin having a tension of from $1 \times 10^7$ to $8 \times 10^8$ dyne/cm$^2$ under an elongation of 200% at a temperature of the glass transition point plus 20° C., carrying out redraw forming at a temperature at which the dynamic friction coefficient of the thermoplastic resin is smaller than 0.5 and which is higher than the glass transition point and carrying out bending elongation of the side wall of the can simultaneously with redraw forming, high reduction of the thickness of bending elongation and improvement of the corrosion resistance of the resin-coated vessel can be simultaneously attained.

4 Claims, 3 Drawing Sheets

PROCESS FOR THE PREPARATION OF A THICKNESS-REDUCED DRAW-FORMED CAN

BACKGROUND OF THE INVENTION (1). Field of the Invention

The present invention relates to a thickness-reduced deep-draw-formed can and a process for the preparation thereof. In the production of a thickness-reduced deep-draw-formed can by draw-redraw forming of an organic resin-coated metal plate and by reduction of the thickness by bending-elongation of a side wall portion of a can, the present invention relates to a process in which high reduction of the thickness and improvement of the corrosion resistance of the product vessel can be simultaneously attained.

(2). Description of the Related Art

As the conventional side seamless can, there can be mentioned a product formed by subjecting a metal blank such as an aluminum plate, a tinplate or a tin-free steel plate to an ironing operation in at least one stage between a drawing die and a punch to form a cup comprising a side seamless barrel and a bottom connected integrally and seamlessly to the barrel, and if desired, subjecting the barrel to an ironing operation between an ironing punch and an ironing die to reduce the thickness of the barrel of the vessel. It also is known that the thickness of the side wall can be reduced by bending-elongation by a curvature corner portion of the redrawing die instead of the above-mentioned ironing operation (see Japanese Unexamined Patent Publication No. 56-501442).

We previously proposed a process comprising holding a preliminarily drawn cup of a coated metal plate by an annular holding member inserted in the cup and a redrawing die, and relatively moving a redrawing punch, which is arranged coaxially with the holding member and redrawing die so that the redrawing punch can come into the holding member and come out therefrom, and the redrawing die so that the redrawing punch and the redrawing die are engaged with each other, to prepare a deep-draw-formed cup having a diameter smaller than the diameter of the preliminarily drawn cup, wherein the radius ($R_D$) of curvature of a working corner portion of the redrawing die is adjusted to a value 1 to 2.9 times the thickness ($t_B$) of the metal blank, the radius ($R_H$) of curvature of a holding corner portion of the holding member is adjusted to a value 4.1 to 12 times the thickness ($t_B$) of the metal blank, planar engaging portions of the holding member and redrawing die with the preliminarily drawn cup have a dynamic friction coefficient of from 0.001 to 0.2, and draw forming of at least one stage is carried out so that the redraw ratio defined by the ratio of the diameter of the shallow-draw-formed cup to the diameter of the deep-draw-formed cup is in the range of from 1.1 to 1.5, to reduce the thickness of the side wall portion of the cup by bending the side wall portion of the cup uniformly along the entire height direction.

According to this proposal, by maintaining the radius of curvature of the redrawing die and the radius of curvature of the holding member within certain ranges and maintaining the dynamic friction coefficients of the holding member and redrawing die with the preliminarily drawn cup within certain ranges, the side wall portion of the can is highly and uniformly bent to reduce the thickness of the side wall portion.

This process for the preparation of a drawn-redrawn, bent thickness-reduced can is advantageous in that a metal plate having a resin coating such as a film can be applied to the production, but since the surface pressure imposed on the preliminarily drawn cup is much larger than the surface pressure imposed in the conventional draw-redraw forming process, various troubles are caused during the forming operation.

Generally, the draw-redraw forming operation is carried out while applying a lubricant, and in view of the processability of the resin coating, it is preferred that the redraw-forming operation be carried out while heating the resin coating at a temperature higher than the glass transition temperature (Tg) of the resin. However, the conditions for reducing the thickness by the above-mentioned bending elongation are within the region of adhesion lubrication under high surface pressure and high temperature (higher than Tg) exceeding the region of complete lubrication or boundary lubrication under low surface pressure and low temperature (lower than Tg). Accordingly, the cohesion area of the resin coating to a mold or tool increases and the interfacial frictional force increases, with the result that the interfacial frictional force exceeds the shearing force among the molecular chains in the resin coating and the adhesion force of the resin coating to the metal substrate. Accordingly, breaking of the coating per se and peeling of the coating from the metal substrate are caused, and the exposed area of the metal increases and the vessel performance is degraded. Especially at a high temperature or in the case where an inclusion is present, the apparent frictional coefficient is sometimes reduced by the temperature, but this is due to reduction of the shearing force among the molecular chains and also in this case, similar problems arise from the viewpoint of the relation between the mold or tool and the resin coating.

SUMMARY OF THE INVENTION

It is therefore a primary object of the present invention to provide a process for preparing a thickness-reduced deep-draw-formed can, in which high reduction of the thickness by bending elongation and improvement of the corrosion resistance of a resin-coated can are simultaneously attained.

Another object of the present invention is to provide a process for preparing a thickness-reduced deep-draw-formed can in which the viscoelastic characteristics of a coating resin and the processing temperature make it possible to highly bend and elongate the resin coating in follow-up with the bending elongation of a metal substrate, and formation of defects in the resin coating can be prevented.

Still another object of the present invention is to provide a draw-redraw-formed can in which a resin coating formed on a metal substrate has an excellent heat resistance, an excellent barrier property to corrosive components and an excellent mechanical strength.

In accordance with one aspect of the present invention, there is provided a process for the preparation of a thickness-reduced drawn can, which comprises draw-forming a resin-coated metal plate and redrawing the obtained preliminarily drawn cup into a can having a smaller diameter, wherein a laminated metal plate comprising a metal plate and a coating layer of a thermoplastic resin having a tension (T) of from $1 \times 10^7$ to $8 \times 10^8$ dyne/cm$^2$ under an elongation of 200% at a temperature of the glass transition point plus 20° C. is used as the resin-coated metal plate, the redraw-forming is carried out at a temperature at which the dynamic friction coefficient ($\mu k$) of the thermoplastic resin is smaller than 0.5 and which is higher than the glass transition temperature, and at the redraw-forming step, the thickness of the side wall of the can is reduced by bending elongation.

In accordance with another aspect of the present invention, there is provided a draw-redraw-formed can prepared from a coated metal plate, wherein the coating layer of the metal plate is composed of a thermoplastic resin having a tension (T) of from $1 \times 10^7$ to $8 \times 10^8$ dyne/cm$^2$ under an elongation of 200% at a temperature of the glass transition point plus 20° C., and the thickness of the side wall of the can is reduced at a thickness reduction ratio of 5 to 45% of the thickness of the metal blank.

DETAILED DESCRIPTION OF THE INVENTION

Figure 1:
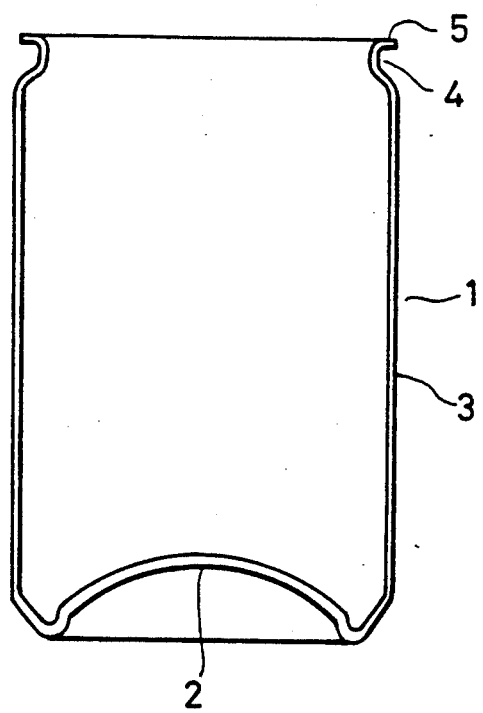
FIG. 1 is a diagram illustrating an embodiment of the deep-draw-formed can of the present invention.

In the present invention, in order to maintain the physical properties of a resin coating formed on a metal substrate at high levels while making it possible to attain high bending elongation of the resin coating in follow-up with the metal substrate, it is important that the resin coating of the laminated metal plate to be subjected to draw-redraw forming should be composed of a thermoplastic resin having a tension of from $1 \times 10^7$ to $8 \times 10^8$ dyne/cm$^2$, especially from $2 \times 10^7$ to $6 \times 10^8$ dyne/cm$^2$, under an elongation of 200% at a temperature of Tg plus 20° C.

The reason why the tension is evaluated based on the value obtained under an elongation of 200% at a temperature of Tg plus 20° C. is that as the results of many experiments made by us, it has been confirmed that the tension of the resin at this temperature has a closest relation to the breaking or interlaminar peeling of the resin coating at the actual forming operation. If the value of this tension becomes large and exceeds the above-mentioned range, the elongation of the resin coating becomes insufficient at the bending elongation and the breaking of the resin coating or the interlaminar peeling of the resin coating from the metal substrate is caused. If the above-mentioned value becomes small and is below the above-mentioned range, no problem arises in connection with the formability, but the heat resistance of the coating of the final can is reduced and peeling or whitening of the coating layer is readily caused under high-temperature and high-pressure conditions, for example, under retort sterilization conditions. Furthermore, this resin coating is generally insufficient in the barrier property to corrosive components and the mechanical strength.

Incidentally, the tension (T) (dyne/cm$^2$) is calculated from the tensile strength F (kg) at an elongation of 200% measured under the following conditions with respect to the resin coating isolated from the resin-coated metal plate:

Sample thickness: d cm
Sample width: 1 cm
measurement temperature: Tg+20° C.
pulling speed: 2500%/min
tension T (dyne/cm$^2$):

$$9.8 \times 10^5 \times \frac{F}{d \times 1}$$

In the present invention, a laminated metal plate having a coating layer of a thermoplastic resin having the above-mentioned high-temperature tensile characteristics is used. The second characteristic feature of the present invention is that redraw forming and bending elongation are carried out at a temperature at which the dynamic friction coefficient the thermoplastic resin is smaller than 0.5, especially smaller than 0.4, and which is higher than the glass transition point.

According to the present invention, the forming temperature is set so that the dynamic friction coefficient is within a certain range and the redraw forming and bending elongation are carried out at this set forming temperature. Under redrawing and bending elongation conditions under which the dynamic friction coefficient exceeds the range defined by the present invention, the difference of the speed between the outer surface of the resin contacted with the surface of the tool and the inner surface of the resin contacted with the metal plate becomes extremely large, and therefore, the strain increases and breaking or peeling is caused in the interior of the resin layer or between the resin layer and the metal substrate, with the result that the area of the exposed metal increases in the final can.

In the present invention, in view of the formability, it is preferred that the temperature dependency of the dynamic friction coefficient be as small as possible in the temperature range of from the glass transition point to the temperature of the glass transition point plus 30° C. Namely, it is generally preferred that this temperature dependency be smaller than 0.015/° C.

The dynamic friction coefficient $\mu k$ is determined in the following manner.

Two metal plates coated with the same resin are arranged between a pair of compressing plates composed of steel so that the resin coating of each coated metal plate confronts the compressing plate, and the coated metal plates are held between the compressing plates with a predetermined force (N) and the two coated metal plates are pulled out at a constant speed. The dynamic friction coefficient $\mu k$ is determined from the frictional force (F) generated at this pulling according to the following formula:

$$\mu k = F/(2N) \tag{1}$$

Incidentally, the metal plate-holding area of each compressing plate is of a length of 10 mm and a width of 20 mm, the pulling speed V is 0.5 m/min and the holding force N is 100 kgf.

The measurement is carried out at the same temperature as the temperature adopted at the redrawing step, and the temperature is controlled by heating of the compressing plates or dissipation of heat therefrom.

Referring to FIG. 1 illustrating one embodiment of the thickness-reduced deep-draw-formed can of the present invention, this deep-draw-formed can 1 is prepared by deep-draw forming (drawing-redrawing) of a resin film-coated metal plate and comprises a bottom 2 and a side wall 3. A flange 5 is formed on the top end of the side wall 3, if desired, through a neck 4. In this can 1, the thickness of the side wall 3 is reduced below the thickness of the bottom 2 by bending elongation.

Figure 2A:
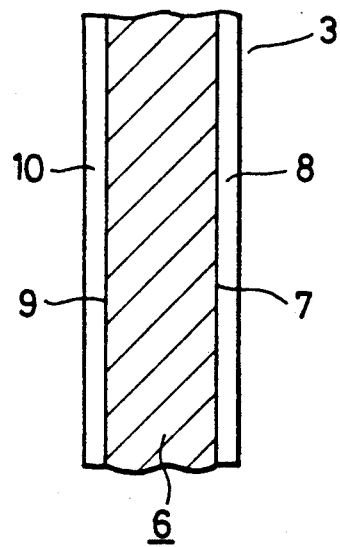
FIGS. 2-A and 2-B are diagram illustrating embodiments of the sectional structure of the side wall portion.
Figure 2B:
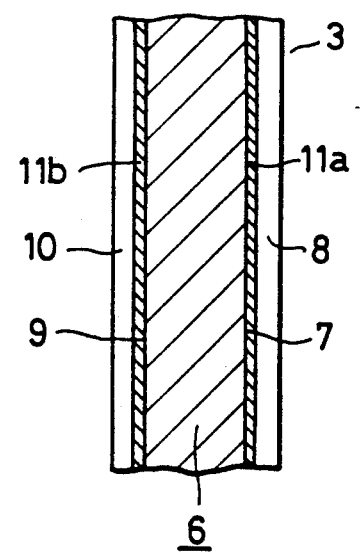

Referring to FIG. 2-A illustrating an example of the sectional structure of the side wall 3, this side wall 3 comprises a metal substrate 6, an inner face resin film coating 8 formed on the inner surface 7 of the metal substrate 6 and an outer surface coating 10 formed on the other surface 9 of the metal substrate 6. Referring to FIG. 2-B illustrating another example of the sectional structure, this sectional structure is the same as the sectional structure shown in FIG. 2-A except that adhesive layers 11a and 11b are interposed between the surface 7 of the metal substrate and the inner face resin film coating 8 and between the metal surface 9 and the outer face organic film 10, respectively.

In each example, the sectional structure of the bottom 2 is the same as the sectional structure of the side wall 2 except that the thickness of the side wall 3 is reduced.

According to the present invention, a laminate having a sectional structure as shown in FIG. 2-A or 2-B, except that the laminate is not subjected to draw-redraw forming and thickness-reducing forming, is first prepared, and this laminate is draw-formed and the obtained preliminarily drawn cup is redraw-formed into a can having a smaller diameter. Simultaneously with this redraw forming, the side wall of the can is subjected to bending elongation to reduce the thickness. Thus, the can of the present invention is prepared. In this preparation process, the resin coating layer in the laminate should satisfy the above-mentioned requirement and the temperature at the redraw forming should satisfy the above-mentioned requirement.

Various surface-treated steel plates and plates of light metals such as aluminum can be used as the metal substrate.

A steel plate formed by annealing a cold-rolled steel plate, subjecting the annealed steel plate to secondary cold rolling and subjecting the steel plate to at least one of zinc deposition, tin deposition, nickel deposition, electrolytic chromate treatment and chromate treatment can be used as the surface-treated steel plate. An electrolytically chromate-treated steel plate is preferably used as the surface-treated steel plate, and an electrolytically chromate-treated steel plate comprising 10 to 200 mg/m$^2$ of a metallic chromium layer and 1 to 50 mg/m$^2$ (as calculated as metallic chromium) of a chromium oxide layer is especially preferably used. This surface-treated steel plate is excellent in the combination of the adhesion of the coating and the corrosion resistance. Another example of the surface-treated steel plate is a tinplate having a deposited tin amount of 0.5 to 11.2 g/m$^2$. Preferably, this tinplate is subjected to a chromate treatment or a chromate/phosphate treatment so that the chromium amount as calculated as metallic chromium is 1 to 30 mg/m$^2$.

Still another example of the surface-treated steel plate is an aluminum-coated steel plate formed by deposition of aluminum or pressure welding of aluminum.

As the light metal plate, there can be used not only a so-called pure aluminum plate but also an aluminum alloy plate. An aluminum alloy having excellent corrosion resistance and processability comprises 0.2 to 1.5% by weight of Mn, 0.8 to 5% by weight of Mg, 0.25 to 0.3% by weight of Zn and 0.15 to 0.25% by weight of Cu, with the balance being Al. It is preferred that the light metal plate be subjected to a chromate treatment or a chromate/phosphate treatment so that the chromium amount as calculated as metallic chromium is 20 to 300 mg/m$^2$.

The blank thickness ($t_B$) of the metal plate differs according to the kind of the metal and the use or size of the vessel, but it is generally preferred that the blank thickness be 0.10 to 0.50 mm, especially 0.10 to 0.30 mm in case of a surface-treated steel plate or 0.15 to 0.40 mm in case of a light metal plate.

The inner face resin film coating used in the present invention should be composed of a thermoplastic resin having a tension (T) of from $1 \times 10^7$ to $8 \times 10^8$ dyne/cm$^2$, and from the relation to the processing temperature, $\mu k$ of the resin coating should be smaller than 0.5.

As the thermoplastic resin satisfying these conditions, there can be mentioned a copolymerized polyester resin composed mainly of ethylene terephthalate units. In this copolymerized polyester resin, as the content of the copolymerized ester units increases, T tends to lower, and as the content of the copolymerized ester units decreases, T tends to increase. Of the copolymerized ester units, aliphatic carboxylic acid ester units tend to reduce T, as compared with aromatic carboxylic acid ester units, and units of a glycol ester having a larger number of carbon atoms tend to reduce T, as compared with ethylene glycol ester units. Accordingly, T can be set at a desired value by changing the content and kind of the copolymerized ester units.

It is generally preferred that terephthalic acid should occupy at least 70 mole%, especially at least 75 mole%, of the dibasic acid component in the copolymerized polyester, ethylene glycol should occupy at least 70 mole%, especially at least 75 mole%, of the diol component, a dibasic acid other than terephthalic acid and/or a diol other than ethylene glycol should occupy 1 to 30 mole%, especially 5 to 25 mole% of the dibasic acid component and/or the diol component, and the value of T be in the above-mentioned range.

As the dibasic acid other than terephthalic acid, there can be mentioned aromatic dicarboxylic acids such as isophthalic acid, phthalic acid and naphthalene-dicarboxylic acid, alicyclic dicarboxylic acids such as cyclohexane-dicarboxylic acid, and aliphatic dicarboxylic acids such as succinic acid, adipic acid, sebacic acid and dodecanedionic acid. These dibasic acids can be used in the form of a mixture of two or more of them. As the diol other than ethylene glycol, there can be mentioned propylene glycol, 1,4-butanediol, diethylene glycol, 1,6-hexylene glycol, cyclohexane dimethanol and an ethylene oxide adduct of bisphenol A. These diols can be used in the form of a mixture of two or more of them.

Preferably, the polyester used has an inherent viscosity (IV) of from 0.55 to 1.9 dl/g.

As the preferred thermoplastic resin other than the polyester, there can be mentioned olefin resins such as polypropylene, an ethylene/propylene copolymer and an ionomer.

The film may be a biaxially drawn film, and the value of T can be controlled by drawing conditions. The degree of the biaxial orientation can be confirmed by the refractive index method, the X-ray diffraction method, the polarization fluorescence method and the like.

In view of the balance between the barrier property to corrosive components and the formability, it is preferred that the thickness of the film be 8 to 50 μm, especially 12 to 40 μm, in the side wall portion.

Of course, known film additives, for example, an antiblocking agent such as amorphous silica, a pigment such as titanium dioxide (titanium white), an antistatic agent and a lubricant can be incorporated into the film according to known recipes.

The inner face film of a thermoplastic copolyester or the like can be directly heat-bonded to the metal substrate, as shown in FIG. 2-A, or can be bonded through an adhesive primer, as shown in FIG. 2-B.

The adhesive primer 11a, 11b to be formed between the inner face film of the copolyester or the like and the metal substrate according to need has an excellent adhesiveness to both of the metal blank and the film. As typical instances of the primer paint having excellent adhesiveness and corrosion resistance, there can be mentioned resol type phenol/aldehyde resins derived from various phenols and formaldehyde, and phenol-/epoxy paints composed of bisphenol type epoxy resins, and a paint comprising a phenolic resin and an epoxy resin at a weight ratio of from 50/50 to 5/95, especially from 40/60 to 10/90, is especially preferably used.

It is generally preferred that the thickness of the adhesive primer layer be 0.3 to 5 $\mu$m.

As the outer face coating, the above-mentioned inner face film of a copolyester or the like can be used, or the outer face coating can be formed of at least one member selected from thermosetting resin paints customarily used for cans, such as a phenol/aldehyde resin, a furan resin, a xylene/formaldehyde resin, a ketone/formaldehyde resin, a urea resin, a melamine resin, an aniline resin, an alkyd resin, a guanamine resin, an unsaturated polyester resin, an epoxy resin, a thermosetting acrylic resin, a triallyl cyanurate resin, a bismaleimide resin, an oleoresinous paint, a thermosetting acrylic paint and a thermosetting vinyl paint.

In order to hide the metal plate and assist the transfer of a blank holder force to the metal plate at the draw-redraw forming step, an inorganic filler (pigment) can be incorporated in the outer face coating or film used in the present invention.

As the inorganic filler, there can be mentioned inorganic white pigments such as rutile or anatase titanium dioxide, zinc flower and gloss white, white extender pigments such as baryta, precipitated baryta sulfate, calcium carbonate, gypsum, precipitated silica, aerosil, talc, fired or unfired clay, barium carbonate, alumina white, synthetic or natural mica, synthetic calcium silicate and magnesium carbonate, black pigments such as carbon black and magnetite, red pigments such as red iron oxide, yellow pigments such as sienna, and blue pigments such as prussian blue and cobalt blue. The inorganic filler can be incorporated in an amount of 10 to 500% by weight, especially 10 to 300% by weight, based on the resin.

The thickness of the outer face coating is selected within the range of from 2 to 30 $\mu$m in case of the paint coating or from 3 to 50 $\mu$m in case of the film.

From the viewpoint of the processing temperature, it is indispensable that the dynamic friction coefficient ($\mu$k) of the inner face resin film of the laminated metal plate used in the present invention should be within the above-mentioned range. This dynamic friction coefficient ($\mu$k) depends on the crystallization degree and orientation degree of the resin film. Namely, as the crystallization degree or orientation degree increases, the value of $\mu$k and the temperature dependency of $\mu$k decrease. Accordingly, it will be understood that $\mu$k of the film can be adjusted by controlling the crystallization degree or orientation degree of the film coating of the laminated metal plate. In general, it is preferred that the molecular orientation by the biaxial drawing be left in the resin film of the laminated metal plate.

According to the present invention, in the process comprising holding a preliminarily drawn cup of a coated metal plate by an annular holding member inserted in the cup and a redrawing die, and relatively moving a redrawing punch, which is arranged coaxially with the holding member and the redrawing die so that the redrawing punch can come into the holding member and come out therefrom, and the redrawing die so that the redrawing punch and the redrawing dye are engaged with each other, to draw-form the preliminarily drawn cup into a deep-draw-formed cup having a diameter smaller than the diameter of the preliminarily drawn cup, at the step of the redraw forming of the preliminarily drawn cup, the redraw forming and bending elongation are carried out at a temperature at which $\mu$k of the resin film layer of the preliminarily drawn cup is smaller than 0.5 and which is higher than the glass transition point of the resin film layer. The temperature of the preliminarily drawn cup can be adjusted by preliminarily heating the preliminarily drawn cup by infrared heating, hot air-circulating furnace heating or the like. Also a method in which a tool is maintained at a certain elevated temperature to control reduction of the temperature of the preliminarily drawn cup is effectively adopted.

Figure 3:
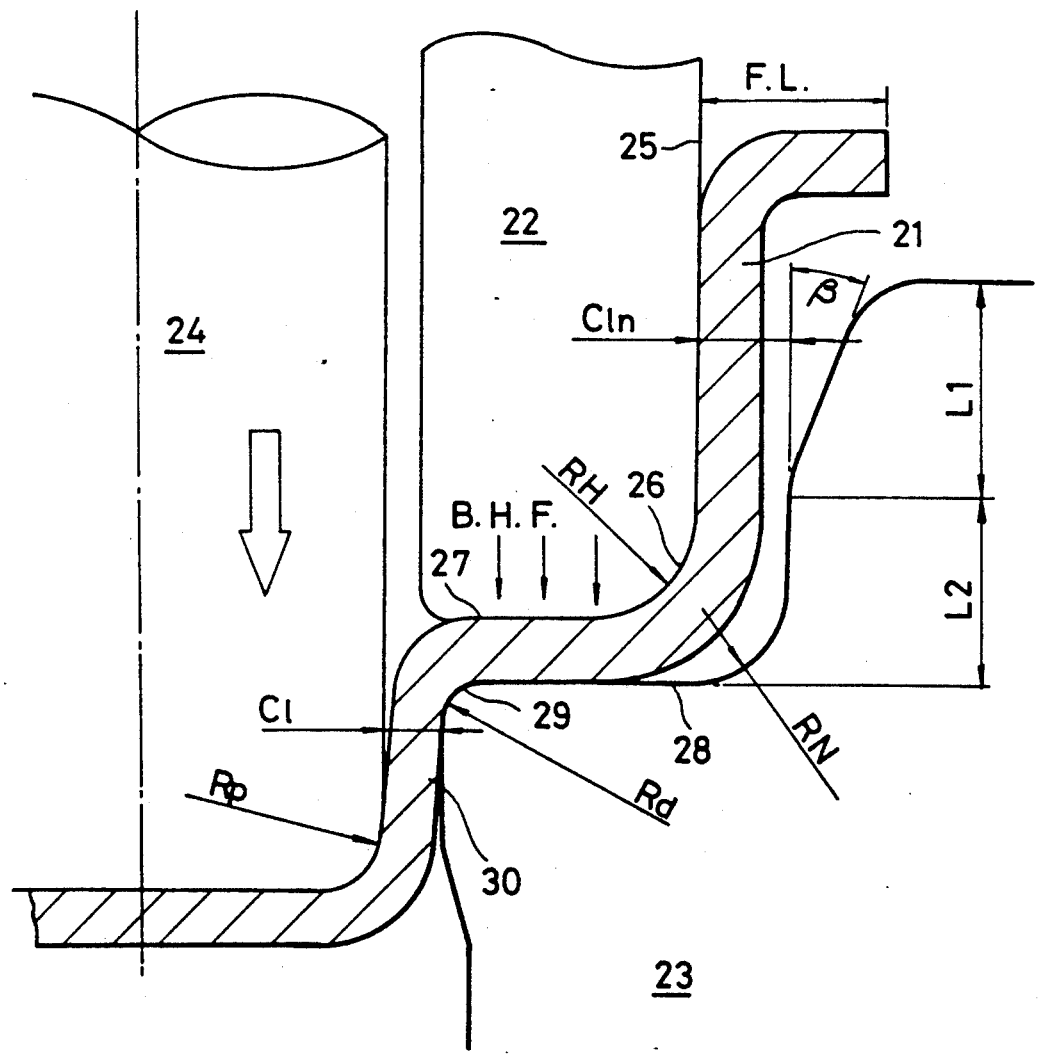
FIG. 3 is a diagram illustrating the redrawing process.

Referring to FIG. 3 illustrating the redrawing process, a preliminarily drawn cup 21 formed of a coated metal plate is held by an annular holding member 22 inserted in the cup 21 and a redrawing die 23 located below. A redrawing punch 24 is arranged coaxially with the holding member 22 and redrawing die 23 so that the redrawing punch can come into the holding member 22 and come out therefrom. The redrawing punch 24 and redrawing die 23 are relatively moved so that they are engaged with each other.

By this relative movement, the side wall of the preliminarily drawn cup is vertically bent inwardly with respect to the radius by an outer circumferential face 25 of the annular holding member 22 through a curvature corner portion thereof, and the side wall of the cup 21 is passed through a portion defined by an annular bottom face 27 of the annular holding member 22 and a top face 28 of the redrawing die 23 and is bent substantially vertically to the axial direction by a working corner portion of the redrawing die 23, whereby a deep-draw-formed cup 30 having a diameter smaller than the diameter of the preliminarily drawn cup 21 is prepared and simultaneously, the thickness of the side wall is reduced by the bending elongation.

Figure 4:
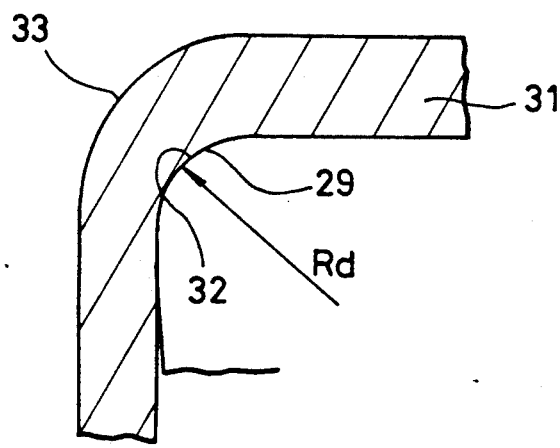
FIG. 4 is a sectional view illustrating the principle of bending elongation.

Referring to FIG. 4 illustrating the principle of bending elongation, the coated metal plate 31 is forcibly bent under a sufficient back tension along the working corner 29 of the redrawing die having a curvature radius $R_D$. In this case, a strain is not produced in a surface 32 on the working corner of the coated metal plate 31, but a surface 33 on the side opposite to the working corner undergoes a strain by pulling. Supposing that curvature radius of the working corner is $R_D$ and the plate thickness is t, this strain quantity $\epsilon_s$ is given by the following formula:

$$\epsilon_s = \frac{2\pi(R_D + t) - 2\pi R_D}{2\pi R_D} = \frac{t}{R_l} \qquad (3)$$

The surface (inner surface) 33 of the coated metal plate is elongated by $\epsilon_s$ at the working corner, and the other surface (outer surface) 32 is elongated by a strain quantity $\epsilon'_s$ which is equal to $\epsilon_s$ ($\epsilon'_s = \epsilon_s$) by the back tension just below the acting corner. If strain quantity $\epsilon_s$ and strain quantity $\epsilon'_s$ appear alternately, a coarse surface having a pitch corresponding to the curvature radius $R_D$ is formed on the surface of the metal. However, the point of initiation of reduction of the thickness by bending elongation is different between the inner surface and the outer surface, and the coarse surface of the above-mentioned pitch appears substantially in a portion other than $R_D$ on the outer surface and the corresponding surface appears substantially in a portion of less than $R_D/2$ on the inner surface. This is especially conspicuous on the coated surface.

If the coated metal plate is thus bent and elongated, the thickness of the coated metal plate is reduced, and the thickness change ratio $\epsilon_t$ is given by the following formula:

$$\epsilon_t = \frac{-t}{R_D + t} \qquad (4)$$

From the above formula (4), it is seen that decrease of the curvature radius $R_D$ of the working corner is effective for reducing the thickness of the coated metal plate. Namely, it is understood that as $R_D$ is decreased, the thickness change $|\epsilon_t|$ is increased. It will also be understood that supposing that the curvature radius $R_D$ is constant, as the thickness t of the coated metal plate is increased, the thickness change $|\epsilon_t|$ is increased.

In the production of a deep-draw-formed can according to the present invention, if the curvature radius $R_D$ of the working corner of the redrawing die is adjusted to a value 1 to 2.9 times, especially 1.5 to 2.9 times, the blank thickness $t_B$ of the metal plate, bending elongation can be effectively performed.

Good results can be obtained when the degree of the thickness of the side wall of the can, that is, the thickness reduction ratio, is 5 to 45%, especially 5 to 40%, of the blank thickness ($t_B$).

According to the present invention, in the production of a thickness-reduced draw-formed can by draw-redraw forming and bending elongation, by using a laminated metal plate comprising a metal plate and a coating layer of a thermoplastic resin having a tension of from $1 \times 10^7$ to $8 \times 10^8$ dyne/cm$^2$ under an elongation of 200% at a temperature of the glass transition point plus 20° C., carrying out redraw forming at a temperature at which the dynamic friction coefficient of the thermoplastic resin is smaller than 0.5 and which is higher than the glass transition point and carrying out bending elongation of the side wall of the can simultaneously with redraw forming, the viscoelastic characteristics of the coating resin and the processing temperature can be adjusted so that the resin coating can be highly bent and elongated in follow-up with the metal substrate, and occurrence of defects in the resin coating can be prevented. Thus, high reduction of the thickness by bending elongation and improvement of the corrosion resistance of the resin-coated vessel can be simultaneously attained.

The present invention will now be described in detail with reference to the following examples that by no means limit the scope of the invention.

The characteristics of resin coatings and vessels shown in the following examples and comparative examples were measured and evaluated according to methods described below.

(A) Inherent Viscosity (IV)

The inherent viscosity was measured at 25° C. with respect to a solution of 0.25 mg of a resin coating isolated from a resin-coated metal plate in 100 ml of phenol/tetrachloroethane (Examples 1 and 2 and Comparative Examples 1 through 5).

(B) Refractive Index (n)

The refractive index (n) of a resin coating isolated from a resin-coated metal plate was measured by an Abbe refractometer.

(C) Crystallinity (Xc)

The density of a resin coating isolated from a resin-coated metal plate was determined according to the density gradient tube method, and the crystallinity was calculated from the determined density according to the following formula:

$$Xc = \frac{\rho - \rho_a}{\rho_c - \rho_a} \times 100$$

wherein $\rho$ represents the measured density (g/cm$^3$), $\rho_a$ represents the density of a completely amorphous polymer, and $\rho_c$ represents the density of a completely crystalline polymer.

Polyethylene terephthalate $\rho_a = 1.335$ g/cm$^3$ $\rho_c = 1.455$ g/cm$^3$

Polypropylene:
$\rho_a = 0.850$ g/cm$^3$ $\rho_c = 0.936$ g/cm$^3$ (D) Glass Transition Temperature The point of initiation of the change of the heat capacity of a resin coating isolated from a resin-coated metal plate was determined as Tg by the DSC method. The temperature-elevating rate was 10° C./min.

(E) Tension

The tension was measured according to the method described hereinbefore.

(F) Dynamic Friction Coefficient ($\mu k$)

The dynamic friction coefficient was measured according to the method described hereinbefore.

(G) Formability

The presence or absence of peeling (delamination) of a resin coating layer and the presence or absence of breaking of the resin coating layer were checked, and the metal exposure (enamel rater value) was measured.

(I) Corrosion Resistance

Cola (carbonated drink) was filled in a thickness-reduced deep-draw-formed can and a lid was seamed to the can. The can was stored at 37°C. for 6 months, and the corrosion state of the inner face of the can and the leakage were examined.

EXAMPLE 1

A biaxially drawn polyethylene terephthalate/isophthalate copolyester film having a thickness of 25 μm was heat-bonded to both the surfaces of a tin-free steel (TFS) plate having a blank thickness of 0.15 mm and a tempering degree of DR-9 to form a resin-coated metal plate (IV of the resin coating was 0.57, n of the resin coating was 1.64 and Xc of the resin coating was 40%). Then, a lubricant was coated on both the surfaces of the coated metal plate, and the coated metal plate was subjected to draw-redraw forming under conditions described below. Then, doming, trimming, necking and flanging were carried out according to customary procedures to form a can barrel for a two-piece can. The obtained results are shown in Table 1. As is seen from the results shown in Table 1, the resin-coated metal plate had a good formability, and a thickness-reduced deep-draw-formed can having an excellent corrosion resistance and a reduced metal exposure was obtained.

Molding Conditions (A) Draw Forming
(1) Temperature for heating coated metal plate (by hot air heating): 70° C.
(2) Blank diameter: 179 mm
(3) Draw ratio: 1.42

(B) Redraw Forming
(1) Temperature for heating of coated metal cup (by tool heating): 70° C.
(2) Primary redraw ratio: 1.29
(3) Secondary redraw ratio: 1.24
(4) Third redraw ratio: 1.20
(5) Curvature radius ($R_D$) of working corner of redrawing die: 0.40 mm
(6) Thickness reduction ratio (can barrel): −20%

COMPARATIVE EXAMPLE 1

A biaxially drawn polyethylene terephthalate film having a thickness of 25 μm, on which an epoxy/phenol adhesive primer had been coated, was heat-bonded to both the surface of a tin-free steel (TFS) plate having a blank thickness of 0.15 mm and a tempering degree of DR-9 to form a resin-coated metal plate (IV of the resin coating was 0.61, n of the resin coating was 1.68 and Xc of the coating resin was 55%). A can barrel for a two-piece can was prepared from this resin-coated metal plate in the same manner as described in Example 1. The obtained results are shown in Table 1. As is seen from the results of Table 1, the can of the present comparative example, in which T was outside the range specified in the present invention, was poor in the corrosion resistance.

COMPARATIVE EXAMPLE 2

A biaxially drawn polyethylene terephthalate/sebacate copolyester film having a thickness of 25 μm was heat-bonded to both the surface of a tin-free steel (TFS) plate having a blank thickness of 0.15 mm and a tempering degree of DR-9 to form a resin-coated metal plate (IV of the resin coating was 0.50, n of the resin coating was 0.60 and Xc of the resin coating was 30%). A can barrel for a two-piece can was prepared from this resin-coated metal plate in the same manner as described in Example 1. The obtained results are shown in Table 1. As is seen from the results shown in Table 1, the can of the present comparative example, in which the tension T of the resin coating was outside the range specified in the present invention, was poor in the corrosion resistance.

EXAMPLE 2

Formation and evaluation were carried out in the same manner as described in Example 1 except that the heating temperature at the redrawing step was changed to 90° C. The obtained results are shown in Table 1. As is seen from the results shown in Table 1, a vessel having excellent formability and corrosion resistance was obtained.

COMPARATIVE EXAMPLE 3

Formation was carried out in the same manner as described in Example 1 except that the heating temperature at the drawing and redrawing steps was changed to room temperature (20° C.). The obtained results are shown in Table 1. From the results shown in Table 1, it is seen that in the present comparative example, in which the redraw-forming temperature was outside the range specified in the present invention, fine breaking was caused and the corrosion resistance was degraded, and the formed vessel could not be practically used.

COMPARATIVE EXAMPLE 4

Formation was carried out in the same manner as described in Example 1 except that the heating temperature at the redrawing step was changed to 120° C. The obtained results are shown in Table 1. As is seen from the results shown in Table 1, the can of the present comparative example, in which the dynamic friction coefficient uk at the redraw-forming temperature was outside the range specified in the present invention, showed a large metal exposure and was poor in the corrosion resistance.

COMPARATIVE EXAMPLE 5

An undrawn polyethylene terephthalate film having a thickness of 40 μm was heat-bonded to both the surfaces of a tin-free steel (TFS) plate having a blank thickness of 0.15 mm and a tempering degree of DR-9 to form a resin-coated metal plate (IV of the coating was 0.55, n of the coating was 1.58 and Xc of the coating was 3%). A can barrel for a two-piece can was prepared from this resin-coated metal plate in the same manner as described in Example 1. The obtained results are shown in Table 1. As is seen from the results shown in Table 1, the can body of the present comparative example, in which the temperature dependency of the dynamic friction coefficient μk was outside the range specified in the present invention, was poor in the formability and corrosion resistance.

EXAMPLE 3

An undrawn polypropylene film having a thickness of 20 μm was heat-bonded to both the surfaces of an Al-Mn type aluminum alloy having a blank thickness of 0.26 mm to form a resin-coated metal plate (n of the coating was 1.49 and Xc of the resin coating was 30%). A can barrel for a two-piece can was prepared from this resin-coated metal plate in the same manner as described in Comparative Example 3 except that the curvature radius ($R_D$) of the working corner of the redrawing die was changed to 0.60 mm. The obtained results are shown in Table 1. As is seen from the results shown in Table 1, the resin-coated metal plate of the present example had a good formability, and a thickness-reduced deep-draw-formed can having a reduced metal exposure and an excellent corrosion resistance could be prepared from this resin-coated metal piece.

TABLE 1

Results of Examples and Comparative Examples

| | Material | Resin-Coated Metal Plate resin coating | | | | Temperature at Drawing Step (°C.) | Temperature at Redrawing Step (°C.) | Formability | | Corrosion Resistance |
| | | tension T(dyne/cm$^2$) | dynamic friction coefficient $\mu k$ | temperature dependency of $\mu k$ (/°C.) | glass transition temperature Tg (°C.) | | | breaking and delamination of coating layer | metal exposure, enamel rater value (mA) | |
|---|---|---|---|---|---|---|---|---|---|---|
| Example 1 | TFS, 0.15 mm | 7.8 × 10$^8$ | 0.17 | 0.010 | 70 | 70 | 70 | no change | 0.02 | good |
| Comparative Example 1 | TFS, 0.15 mm | 8.2 × 10$^8$ | 0.10 | 0.008 | 70 | 70 | 70 | breaking | not evaluated | not evaluated |
| Comparative Example 2 | TFS, 0.15 mm | 0.9 × 10$^7$ | 0.50 | 0.014 | 45 | 70 | 70 | no change | 0.03 | violent corrosion below coating |
| Example 2 | TFS, 0.15 mm | 7.8 × 10$^8$ | 0.25 | 0.010 | 70 | 70 | 90 | no change | 0.001 | good |
| Comparative Example 3 | TFS, 0.15 mm | 7.8 × 10$^8$ | 0.21 | 0.010 | 70 | 20 | 20 | fine breaking | 1.6 | violent corrosion below coating |
| Comparative Example 4 | TFS, 0.15 mm | 7.8 × 10$^8$ | 0.88 | 0.010 | 70 | 70 | 120 | delamination | 3.2 | violent corrosion |
| Comparative Example 5 | TFS, 0.15 mm | 1.1 × 10$^7$ | 0.20 | 0.016 | 70 | 70 | 70 | fine breaking | 1.8 | violent corrosion below coating |
| Example 3 | Al, 0.26 mm | 3.3 × 10$^8$ | 0.20 | 0.010 | −13 | 20 | 20 | no change | 0.004 | good |

We claim:

1. A process for the preparation of a thickness-reduced drawn can, which comprises draw-forming a resin-coated metal plate and redrawing the obtained preliminarily drawn cup into a can having a smaller diameter, wherein the resin coated metal plate is a laminated metal plate comprising a metal plate and a coating layer of a thermoplastic copolyester resin comprising ethylene terephthalate having a tension (T) of from $1 \times 10^7$ to $8 \times 10^8$ dyne/cm$^2$ under an elongation of 200% at a temperature of the glass transition temperature plus 20° C. and the redraw-forming is carried out at a temperature at which the dynamic friction coefficient ($\mu k$) of the thermoplastic copolyester resin is smaller than 0.5 and which is equal to or higher than the glass transition temperature, while elongating the side wall of the can by bending and pulling to reduce the thickness of the side wall of the can.

2. A process according to claim 1, wherein the dynamic friction coefficient of the thermoplastic resin has a temperature dependency smaller than 0.015/° C. in a temperature range of from the glass transition temperature to the glass transition temperature plus 30° C.

3. A process according to claim 1, wherein the degree of reduction of the thickness of the side wall of the can is 5 to 45% of the blank thickness.

4. A process according to claim 1, wherein the thermoplastic resin coating comprises a copolyester in which terephthalic acid is at least 70 mole% of a diol component, and 1 to 30 mole % of the dibasic acid component and/or the diol component comprises a dibasic acid other than terephthalic acid and/or a diol other than ethylene glycol.

* * * * *